(12) United States Patent
Fenton

(10) Patent No.: US 7,738,537 B2
(45) Date of Patent: Jun. 15, 2010

(54) APPARATUS FOR AND METHOD OF DETERMINING QUADRATURE CODE TIMING FROM PULSE-SHAPE MEASUREMENTS MADE USING AN IN-PHASE CODE

(75) Inventor: Patrick C. Fenton, Calgary (CA)

(73) Assignee: NovAtel Inc., Calgery, Alberta (CA)

( * ) Notice: Subject to any disclaimer, the term of this patent is extended or adjusted under 35 U.S.C. 154(b) by 669 days.

(21) Appl. No.: 11/226,174

(22) Filed: Sep. 14, 2005

(65) Prior Publication Data

US 2007/0058700 A1      Mar. 15, 2007

(51) Int. Cl.
*H04B 1/00* (2006.01)
(52) U.S. Cl. .................. 375/150; 375/134; 375/137; 375/139; 375/140; 375/142; 375/145; 375/149
(58) Field of Classification Search ................ 375/134, 375/137, 139, 140, 142, 145, 149, 150
See application file for complete search history.

(56) References Cited

U.S. PATENT DOCUMENTS

| | | | |
|---|---|---|---|
| 4,894,842 A | | 1/1990 | Broekhoven et al. |
| 5,134,407 A | * | 7/1992 | Lorenz et al. ............ 342/352 |
| 5,390,207 A | | 2/1995 | Fenton et al. |
| 5,402,450 A | | 3/1995 | Lennen |
| 5,414,729 A | | 5/1995 | Fenton |
| 5,630,208 A | | 5/1997 | Enge et al. |
| 5,654,980 A | | 8/1997 | Latva-aho et al. |
| 5,764,686 A | | 6/1998 | Sanderford et al. |
| 5,963,582 A | | 10/1999 | Stansell, Jr. |
| 5,990,827 A | | 11/1999 | Fan et al. |

(Continued)

FOREIGN PATENT DOCUMENTS

EP      0892277 A2      1/1999

(Continued)

OTHER PUBLICATIONS

Bingeman, Mark; Khandani, Amir K.; Symbol-Based Turbo Codes; IEEE Communications Letters, vol. 3, No. 10, Oct. 1999, pp. 285-287.

(Continued)

*Primary Examiner*—Shuwang Liu
*Assistant Examiner*—Kabir A Timory
(74) *Attorney, Agent, or Firm*—Cesari and McMenna, LLP; Patricia A. Sheehan

(57) ABSTRACT

A pre-correlation filter determines the timing of a second pseudorandom number ("PRN") code, using an image of the average chip shape formed for a first PRN code. The filter collects measurements corresponding to samples of a received signal over multiple code chips of the first PRN code at sample times that are asynchronous to code rate. A code phase decoder directs the measurements to accumulation registers that are associated with code chip ranges that are fractions of a code chip of the first PRN code based on the code phase angles of the samples in the first PRN code, to accumulate measurements relating to chip transitions in the first PRN code and measurements relating to chip transitions in the second PRN code. The chip edges of the second PRN code are detected from the image of average chip shape for the first PRN code formed from the accumulated measurements.

17 Claims, 11 Drawing Sheets

U.S. PATENT DOCUMENTS

| | | | |
|---|---|---|---|
| 6,031,881 A | 2/2000 | Weill et al. | |
| 6,195,328 B1 | 2/2001 | Tsui et al. | |
| 6,236,687 B1 | 5/2001 | Caso et al. | |
| 6,243,409 B1 * | 6/2001 | Fenton et al. | 375/137 |
| 6,259,401 B1 | 7/2001 | Woo | |
| 6,370,207 B1 | 4/2002 | Weill et al. | |
| 6,466,612 B2 | 10/2002 | Kohli et al. | |
| 6,493,376 B1 | 12/2002 | Harms et al. | |
| 6,493,378 B1 | 12/2002 | Zhodzishsky et al. | |
| 6,532,251 B1 | 3/2003 | King et al. | |
| 6,636,558 B1 | 10/2003 | Schnaufer et al. | |
| 6,658,048 B1 | 12/2003 | Valio | |
| 6,751,247 B1 | 6/2004 | Zhengdi | |
| 6,798,758 B1 | 9/2004 | Chun et al. | |
| 6,868,110 B2 | 3/2005 | Phelts et al. | |
| 6,912,242 B2 | 6/2005 | Farine et al. | |
| 6,967,992 B1 | 11/2005 | Rabaeijs et al. | |
| 7,042,930 B2 | 5/2006 | Dafesh | |
| 7,224,721 B2 | 5/2007 | Betz et al. | |
| 7,295,633 B2 | 11/2007 | Kohli et al. | |
| 7,298,324 B2 | 11/2007 | Manz | |
| 2002/0181632 A1 | 12/2002 | Kang et al. | |
| 2003/0202569 A1 | 10/2003 | Kim et al. | |
| 2004/0208236 A1 | 10/2004 | Fenton | |
| 2005/0025222 A1 | 2/2005 | Underbrink et al. | |
| 2006/0018371 A1 | 1/2006 | Medlock | |

FOREIGN PATENT DOCUMENTS

| | | |
|---|---|---|
| WO | WO 97/06446 | 2/1997 |

OTHER PUBLICATIONS

Lawrence R. Weill, Multipath Mitigatyion Using Modernized GPS Signals: How Good Can it Get?, Dept. of Mathematics, California State University, Fullerton, pp. 493-505, ION GPS 2002, Sep. 24-27, 2002, Portland, OR.

* cited by examiner

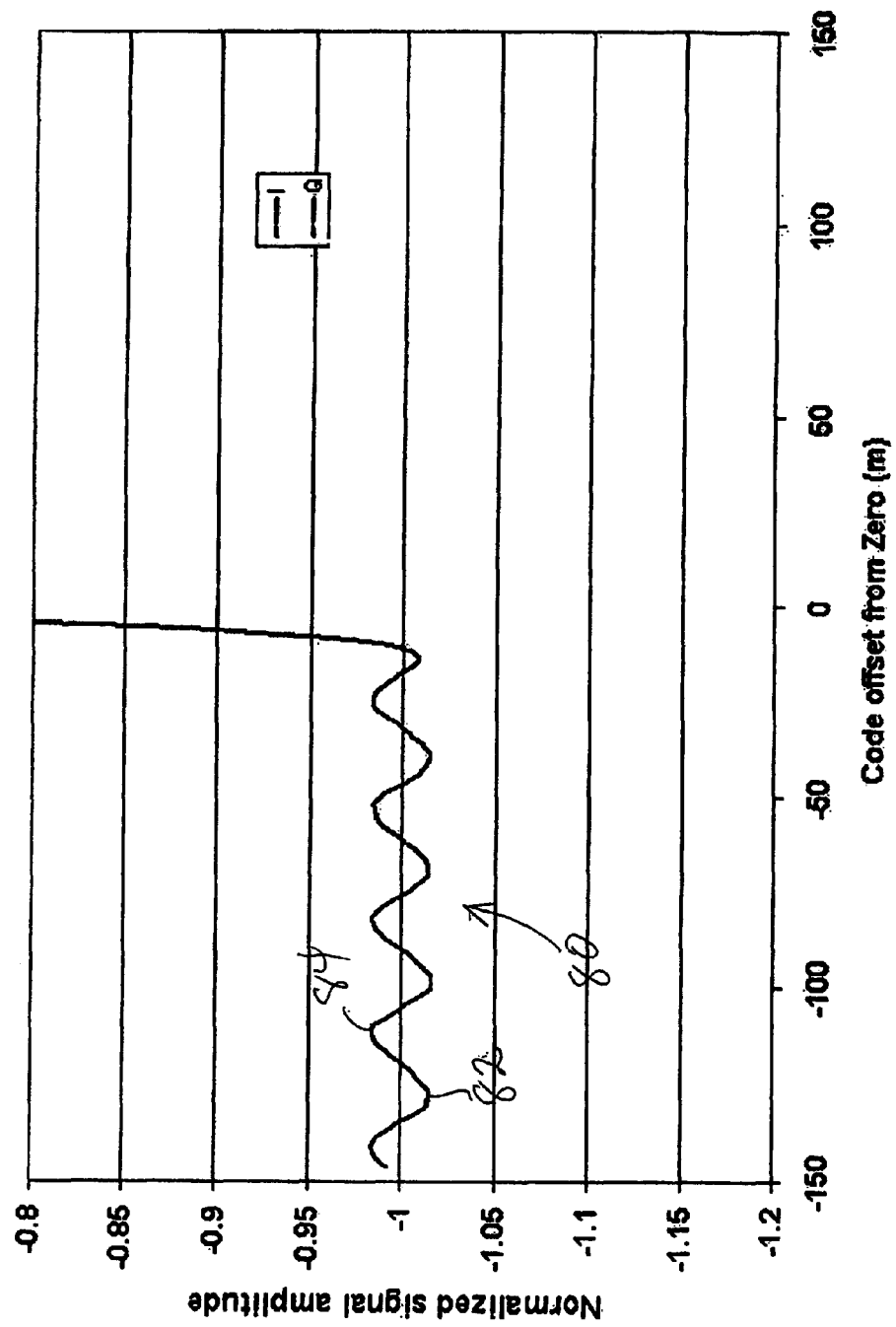

APPARATUS FOR AND METHOD OF DETERMINING QUADRATURE CODE TIMING FROM PULSE-SHAPE MEASUREMENTS MADE USING AN IN-PHASE CODE

CROSS-REFERENCE TO RELATED APPLICATIONS

The present application is related to U.S. patent application Ser. No. 10/823,030, which was filed on Apr. 13, 2004, by Patrick C. Fenton for a APPARATUS FOR AND METHOD OF MAKING PULSE-SHAPE MEASUREMENTS and is hereby incorporated by reference.

BACKGROUND OF THE INVENTION

1. Field of the Invention

The invention relates generally to systems for measuring the pulse shape of a broadcast spread-spectrum signal and, in particular, to systems that provide estimates of quadrature code chip times based on the pulse shape measurements of the code chips of an in-phase code.

2. Background Information

One example of a system that utilizes broadcast spread-spectrum signals is a global positioning system, such as, GPS, GLONAS or Galileo systems. The system receivers determine their global positions based on the signals they receive from associated satellites. The broadcast spread-spectrum signal generally consists of in-phase and quadrature channels, each of which have a carrier that is modulated by at least one pseudorandom code, such as a binary pseudorandom number (PRN) code that consists of a seemingly random sequence of one and zeros that periodically repeat. The ones and zeros in the PRN code, are referred to as "code chips," and the transitions in the code from one to zero or zero to one, which occur at "code chip times," are referred to as "bit transitions." The respective satellites use unique PRN codes, and thus, a receiver can associate a received signal with a particular satellite by determining which PRN code is included in the signal.

The receiver calculates the difference between the time a satellite transmits its signal and the time that the receiver receives the signal. The receiver then calculates its distance, or "pseudorange," from the satellite based on the associated time difference. Using the pseudoranges from at least four satellites, the receiver determines its global position.

To determine the time difference, the receiver synchronizes locally-generated PRN codes with the PRN codes in the received signal by aligning the code chips in each of local codes with the chips in the corresponding satellite generated unique PRN codes. It then determines how much the locally-generated PRN codes are shifted, in time, from the known timing of the satellite PRN codes at the time of transmission, and calculates the associated pseudoranges by multiplying the measured time shifts by the speed of light. The more closely the receiver aligns the locally-generated PRN code with the PRN code in the received signal, the more precisely the receiver can determine the associated time difference and pseudorange and, in turn, its global position.

The code synchronization operations include acquisition of the satellite PRN code and tracking the code. To acquire the PRN code, the receiver generally makes a series of correlation measurements that are separated in time by a code chip, to determine when the locally-generated code aligns with the received code to within one code chip. To thereafter track the PRN code, the receiver generally makes correlation measurements that are associated with the received PRN code and early and late versions of the locally-generated PRN code. The receiver thus produces an associated error signal that is proportional to the misalignment between the local PRN code and the received PRN code. The error signal is used, in turn, to control the PRN code generator, which shifts the local PRN code essentially to minimize the error signal.

The receiver also typically aligns the satellite carrier with a local carrier using correlation measurements associated with a punctual version of the local PRN code. To do this the receiver uses a carrier tracking phase lock loop.

The receiver receives not only line-of-sight, or direct path, satellite signals but also multipath signals, which are signals that travel along different paths and are reflected to the receiver from the ground, bodies of water, nearby buildings, etc. The multipath signals arrive at the receiver after the direct-path signal and combine with the direct-path signal to produce a distorted received signal. This distortion of the received signal adversely affects code synchronization operations because the correlation measurements, which measure the correlation between the local PRN code and the received signal, are based on the entire received signal—including the multipath components thereof. The distortion may be such that the receiver attempts to synchronize to a multipath signal instead of to the direct-path signal. This is particularly true for multipath signals that have code bit transitions that occur close to the times at which code bit transitions occur in the direct-path signal.

One way to more accurately synchronize the received and the locally-generated PRN codes is to use the "narrow correlators" discussed in U.S. Pat. Nos. 5,101,416; 5,390,207 and 5,495,499. It has been determined that narrowing the delay spacing between early and late correlation measurements substantially reduces the adverse effects of noise and multipath signal distortion on the early-minus-late measurements. The delay spacing is narrowed such that the noise correlates in the early and late correlation measurements. Also, the narrow correlators are essentially spaced closer to a correlation peak that is associated with the punctual PRN code correlation measurements than the contributions of many of the multipath signals. Accordingly, the early-minus-late correlation measurements made by these correlators are significantly less distorted than they would be if they were made at a greater interval around the peak.

Another way to more accurately synchronize the received and the locally-generated PRN codes is to use a multipath mitigation processing technique that iteratively produces estimates of the direct path signal and one or more of the multipath signals. One such technique is described in U.S. Pat. Nos. 5,615,232 and 6,692,008. Another technique that uses multiple correlators is described in U.S. Pat. No. 5,414,729. Yet another multipath mitigation technique is discussed in Weill, "Multipath Mitigation Using Modernized GPS Signals: How Good Can It Get," *ION GPS* 2002, Portland, Oreg., Sep. 24-27, 2002.

The multipath mitigation processing techniques are based on the manipulation of pulse-shape information that corresponds to samples of the received signal taken at discrete code-phase offsets. The samples are taken in synchronism with a sample clock, with a predetermined number of samples taken per code chip.

Each signal in the pulse is represented by three parameters $[\tau, A, \theta]$, where $\tau$ represents the time offset or code delay, A represents the amplitude, and $\theta$ represents the phase angle. The basic form of the manipulations that extract the direct path signal, $[\tau_d, A_d, \theta_d]$, and two multipath signals, $[\tau_{mp1}, A_{mp1}, \theta_{mp1}]$ and $[\tau_{mp2}, A_{mp2}, \theta_{mp2}]$, is:

$$[\tau_d, A_d, \theta_d, \tau_{mp1}, A_{mp1}, \theta_{mp1}, \tau_{mp2}, A_{mp2}, \theta_{mp2}] = f \begin{bmatrix} I_1, Q_1 \\ I_2, Q_2 \\ I_3, Q \\ \vdots \\ I_n, Q_n \end{bmatrix}$$

where the $I_i$, $Q_i$ values are the pulse-amplitude samples measured at discrete code-phase offsets along the fractional length of the expected pseudo-random-noise ("PRN") chip.

The input data from discrete sample points of the received spread-spectrum signal are samples from the composite signal, which includes the direct and the multipath signals. The accuracy of the multipath mitigation processing is inversely proportional to the thermal-noise level corrupting the samples of the incoming spread-spectrum signal. Individual samples of the signal are too noisy to achieve acceptable results, and a certain amount of filtering of the incoming signal is required to provide accurate multipath detection using the multipath mitigation techniques.

Multipath interference is usually slowly varying with respect to the frequency of the spread spectrum chip rate. Over a relatively long period of time, (a few seconds) the multipath interference affects every chip of the incoming signal the same way. The thermal noise, which dominates the signal, varies rapidly with each chip of the incoming signal and can be easily filtered.

A GNSS satellite signal, such as a GPS signal, typically includes PRN codes on both the in-phase and the quadrature signal channels. GPS signals, for example, have the clear/acquisition (C/A) code on the in-phase channel and the P-code on the quadrature channel. The C/A code has 1023 chips per code epoch and is transmitted at 1.023 MHz. The P-code, which is transmitted at 10.23 MHz, repeats once a week and, thus, has many more chips per code epoch than the C/A code. GPS receivers can not directly acquire and track the P-code. However, there is a known phase relationship between the C/A and P codes at the time of transmission. Accordingly, the GPS receiver operating in a conventional manner first acquires and tracks the C/A code and, based on the C/A code phase and timing, controls a local P-code PRN code generator to bring the local P-code sufficiently close to the received P-code that the GPS receiver can then acquire and track the P-code. The receiver then produces, from the quadrature signal channel, P-code demodulated signal strength values that the receiver uses to produce P-code pseudorange measurements.

Many commercial applications require P-code pseudorandom measurements. Accordingly, conventional GPS receivers include local PRN code generators for all of the C/A codes and the P codes transmitted by the respective satellites, as well as the associated code-tracking hardware, such as C/A code and P code phase generators and so forth. This adds complexity to the receivers and also increases the cost of the receivers.

SUMMARY OF THE INVENTION

The invention is a pre-correlation filter and a receiver that utilizes the filter to determine the precise timing of, for example, a pseudorandom number (PRN) code on the quadrature channel of a received signal using an image of the average chip shape that the filter forms for a PRN code on the in-phase channel. The image is expressed as a time series of complex power measurements along the length of a single chip. The averaging process retains the detail of the composite in-phase signal (direct plus multipath signals) while reducing the level of signal noise by an amount proportional to the length of the averaging process. An analysis of the image reveals that there is, in the in-phase channel signal that is averaged, information from the quadrature channel signal. The quadrature channel signal information produces, in the image of the average chip shape of the in-phase channel PRN code, a "wiggle" that corresponds to the timing of the chips of the quadrature channel PRN code. The receiver can thus detect the chip edges of the quadrature PRN code directly from an analysis of the high frequency phase modulations of the complex vector of samples that represents the average chip shape. Specifically, using GPS signals, the receiver detects the P-code transitions by synchronizing to the 10.23 MHz phase modulations in the complex vector of samples that represent the averaged chip shape. The receiver uses the detected P-code transitions and, more particularly, the P-code transitions that are closest to the clear/acquisition (C/A) code transitions, to produce P-code phase information that is used in pseudorange calculations to remove biases associated with timing differences between the transmission of the in-phase and quadrature PRN codes. The calculated pseudoranges for the in-phase PRN code, in the example the C/A code, then have the same accuracy as the pseudoranges generated using full P-code chip tracking or semi-codeless P-code tracking techniques, without requiring the use of local P-code generators and the associated P-code tracking hardware.

The receiver includes in a given receiver channel, in the example, the in-phase channel, an array of complex-accumulation registers. Each complex register consists of an I accumulation register and a Q accumulation register, and each of these accumulation registers can be separately and selectively enabled. The respective complex accumulation registers accumulate measurements that are associated with signal samples that are taken from specific ranges of locations, or code phase angles, along a spread-spectrum chip of the in-phase PRN code.

The length of the chip is divided into a plurality of "ranges," that is, into fractions of a chip. The ranges may but need not be the same size across the chip, and preferably the ranges are smaller near the rising edge of the chip. The ranges are associated with the respective complex accumulation registers. When a sample is taken, a corresponding measurement is added to the appropriate I and Q accumulation registers that are associated with the range that includes the code phase angle estimated for the sample. As discussed in more detail below, the complex accumulation registers act as a pre-correlation filter, by collecting the measurements at sample times that are asynchronous with the code rate. In this way, the system avoids including associated correlation errors in the filtering process.

The system accumulates the measurements over many chips. The accumulation has essentially the same effect as a low-pass filter, and thus, wide-bandwidth noise is suppressed. The accumulated measurements, which provide the average chip shape of at least the direct path signals, are used by a multipath mitigation processing technique to compute the error of the code tracking loop due to multipath interference. The computed multipath error is then used to correct the in-phase channel code tracking loop, and thereby, provide more accurate pseudorange measurements. The multipath mitigation processing may also be used to compute the error of the in-phase channel carrier tracking loop due to multipath interference, with the computed error being used to correct the carrier tracking loop to provide even greater accuracy.

As also discussed below, the number, size and starting points of the ranges may be adjusted as the multipath mitigation processing estimates the locations of the chip transitions in the direct path signal. The ranges that include the chip edges may be narrowed, and those that include the middle of the chip may be widened. Alternatively or in addition, the number of ranges may be reduced.

The pulse shape measurements may also be compared to a reference chip transition shape or shapes, to determine if the received signal includes interference that may cause range distortions. The receiver may then ignore the affected signals or correct for the interference, as appropriate.

The receiver also detects quadrature channel PRN code transitions from the demodulated in-phase PRN code signal strength. The receiver uses information from the accumulated measurements to determine the location of the quadrature PRN code transitions that are closest to the chip transitions in the in-phase PRN code. As described below, the receiver may use the same or a separate array of registers to accumulate the measurements associated with the detected quadrature PRN code transitions. Based on the relative timing of the associated transitions in the in-phase PRN code and the quadrature PRN code, the receiver can eliminate associated biases from the in-phase code pseudorange measurements without having to acquire and track the quadrature PRN code. Accordingly, the receiver need not include a local generator for the quadrature PRN code and/or associated P-code tracking hardware.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
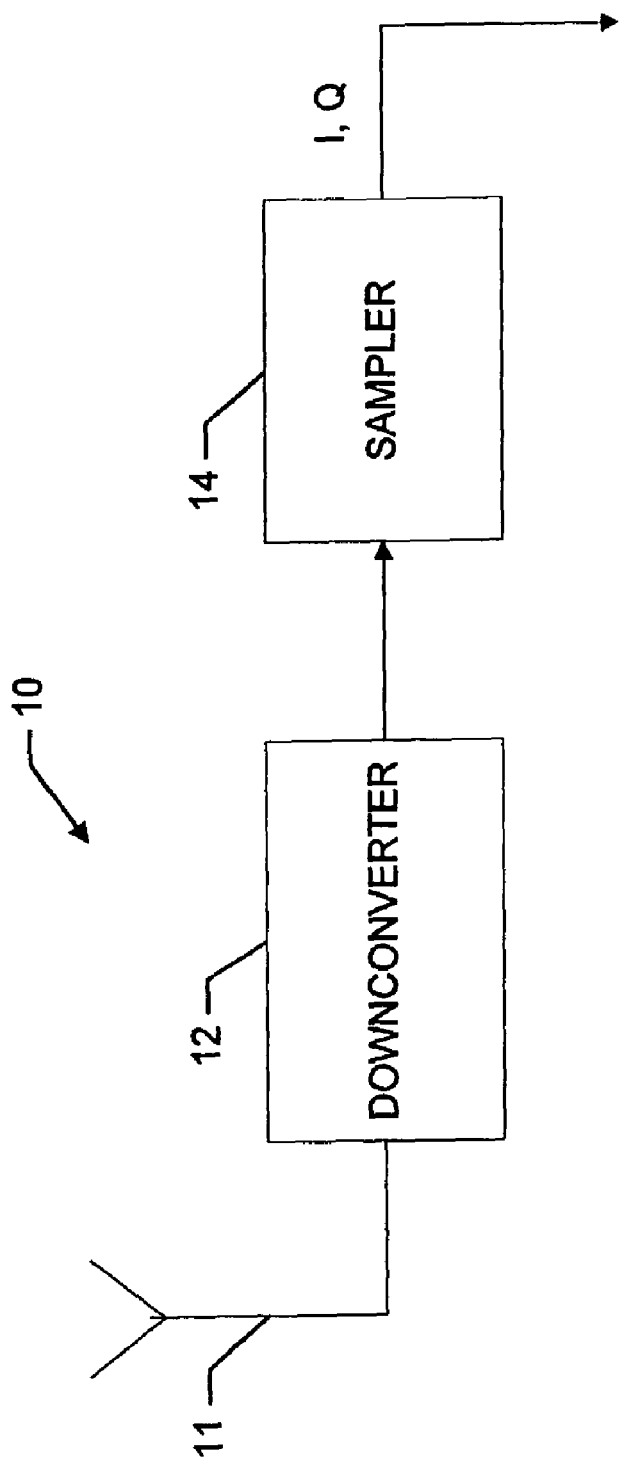
FIG. 1 is a block diagram of a spread-spectrum receiver that employs the present invention's teachings.

Referring to FIG. 1, a receiver 10 receives over an antenna 11 a composite signal that includes direct path signals and associated multipath signals. A downconverter 12 and sampler 14 operate in a conventional manner, to downconvert the received composite signal and in the exemplary embodiment take sequential samples of the downconverted signal. The sequential samples are provided to the respective channels 16 (FIG. 2).

Figure 2:
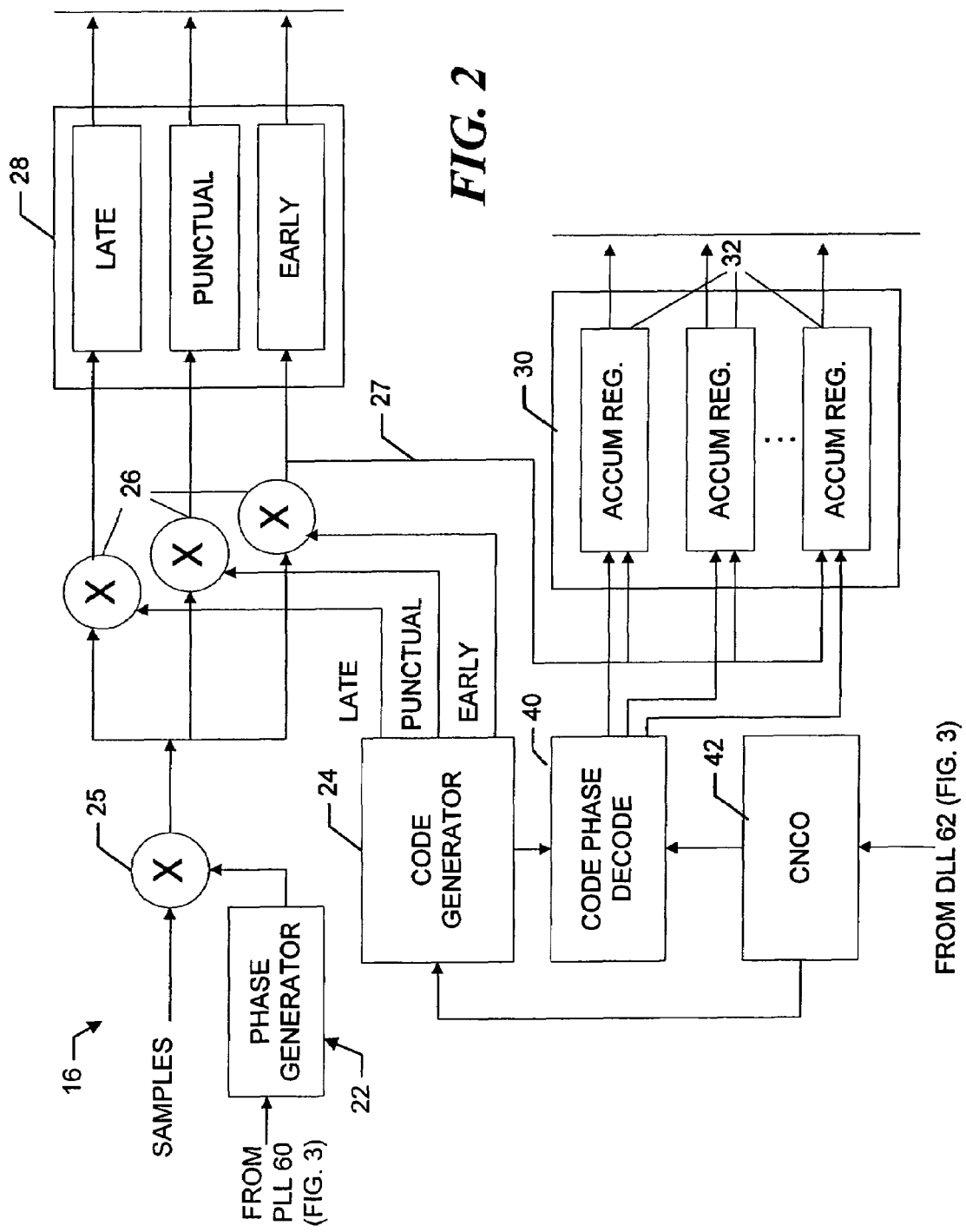
FIG. 2 is a more detailed block diagram of a receiver channel.
Figure 3:
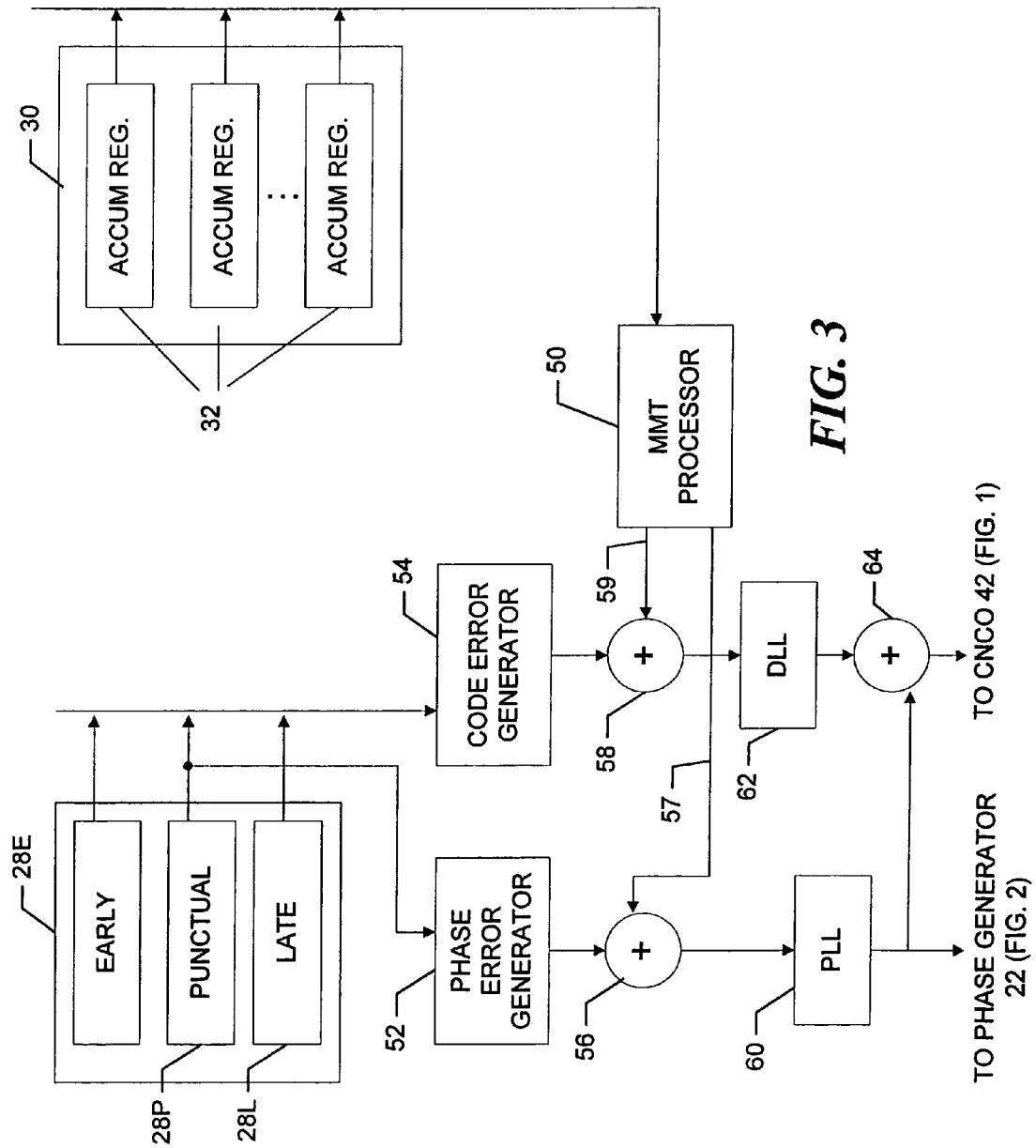
FIGS. 3 and 4 are more detailed block diagrams of components of the channel.

Referring now to FIG. 2, a given channel 16 which in the example demodulates an in-phase PRN code, that is, a PRN code that is transmitted on the in-phase channel of the satellite signal, includes a mixer 25 that removes the carrier from the samples by mixing them with an estimate of the associated carrier phase. Thus, in a known manner, the sequential samples are each mixed with both sine and cosine transformations of the estimated carrier phase to produce a corresponding complex I and Q sample pair. The carrier phase estimate is generated by a phase generator 22, which is controlled in a known manner by a carrier tracking error signal that is produced by a carrier phase lock loop ("PLL") 60 (FIG. 3). As discussed in more detail below with reference to FIG. 3, the PLL is controlled by a carrier phase error signal that is first manipulated to remove therefrom the adverse affects of multipath.

The channel 16 further includes a spread-spectrum code generator 24, which operates in a known manner to produce a locally-generated spread-spectrum code that corresponds to one of the in-phase PRN codes in the received signal. In the example of a GPS system, the code generator 24 produces a locally-generated C/A code that is the same as the C/A code that is transmitted by one of the satellites then in view. The code generator 24 further produces phase-delayed versions of the locally generated C/A code. The versions may be, for example, one-half chip Early, Punctual, and one-half chip Late versions. The I and Q samples are multiplied by the Early, Punctual and Late versions of the code in multipliers 26, to produce corresponding early, punctual and late measurement signals. The measurement signals are accumulated in Early, Punctual and Late complex accumulators 28. The operations of the complex accumulators are described in more detail below with reference to FIG. 5.

A code numerically controlled oscillator ("CNCO") 42 drives the code generator 24, to bring the local code into alignment with the received code. The CNCO is, in turn, driven by a code tracking error signal, which is based on a DLL error signal that is produced by a code tracking delay lock loop ("DLL") 62 (FIG. 3). As discussed in more detail below with reference to FIG. 3, the DLL is controlled by a code error signal that is first manipulated to remove therefrom the adverse affects of multipath. The CNCO 42 is discussed in more detail with reference to FIG. 4 below.

The early measurements on line 27 are also provided to an array 30 of complex accumulation registers 32. As discussed in more detail below, a code phase decoder 40 selectively enables the accumulation registers, such that a given early measurement is accumulated by the appropriate accumulation register 32. The accumulated measurements from the respective registers are provided at appropriate times to a multipath mitigation processor 50, which is referred to hereinafter as the "MMT" processor (FIG. 3). As discussed in more detail below, the multipath mitigation processor processes the measurements in accordance with a known multipath mitigation technique ("MMT"), to determine at least an estimate of the location of the chip edge of the direct path signal from the array of accumulated pulse shape measurements 32. The multipath mitigation processor 50 further produces carrier tracking and code tracking multipath error signals on lines 57 and 59, respectively. The signals are used by adders 56 and 58 to remove adverse affects of multipath from the carrier and code tracking operations.

Referring now also to FIG. 3, a phase error generator 52 converts the values accumulated by the Punctual accumulator 28P to a phase error signal in a conventional manner, using an arctan-like function. The adder 56 corrects the phase error signal by adding thereto the multipath phase correction signal produced by the MMT processor 50. The multipath-corrected phase error signal is then used by the PLL 60, to produce the phase tracking error signal that controls the phase generator 22.

A code error generator 54 uses the early, punctual and late values from the Early, Punctual and Late accumulators 28E, 28P, 28L in a conventional manner to estimate a code error using a formula that corresponds to the following:

$$CodeError = \frac{I_E^2 + Q_E^2 - I_L^2 - Q_L^2}{I_P^2 + Q_P^2}$$

An adder 58 corrects the code error signal produced by the code error generator 54 by adding thereto a multipath code phase correction signal produced by the MMT processor 50. The multipath-corrected code error signal is then used by the DLL 62, to produce the associated DLL error signal. An adder 64 combines the DLL error signal with the carrier tracking error signal produced by the PLL 60, to correct for changes in Doppler. The result is the code tracking error signal that is supplied to the CNCO 42.

Figure 4:
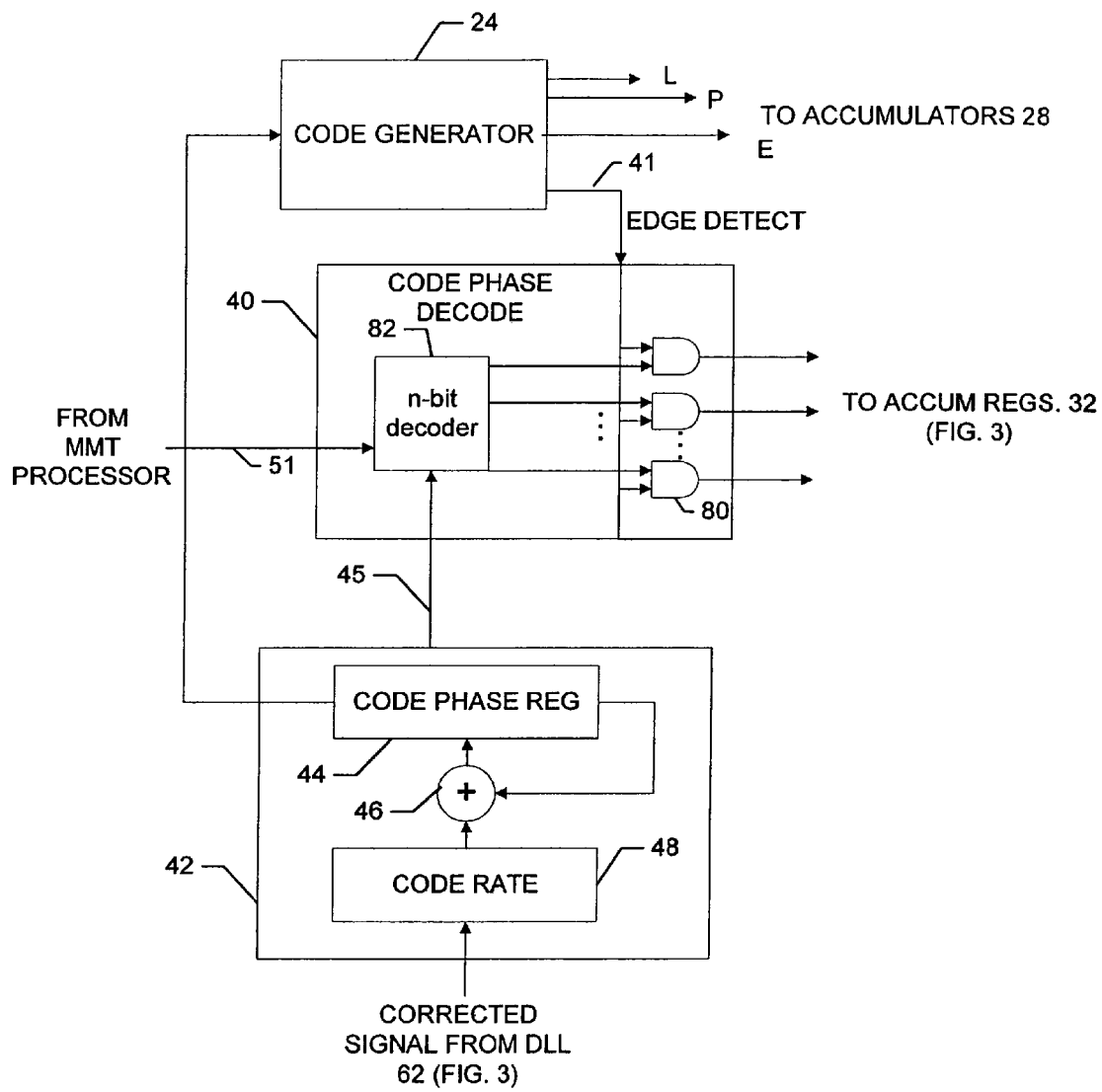

Referring now also to FIG. 4, the CNCO 42 produces chip-edge clock signals, which are used to align the phase of the locally-generated punctual C/A code produced by the code generator 24 to the phase of the received code. The CNCO also produces fine code chip phase detail signals that are used to represent the estimated code phases of respective I and Q samples. The CNCO includes a code rate register 48 that controls a code phase register 44. The code rate register produces a code rate error signal that is combined, in adder 46, with a code phase register feedback. The result drives the register to produce the code generator control signal at appropriate times. The correction provided by the code rate register is based on the code tracking error signal.

The code phase register at any given time contains a count that corresponds to estimated code phase, that is, to an estimated phase angle. When the count corresponds to the start of a new C/A code chip, the code phase register provides a signal to the code generator 24, which then produces the next chip of the locally generated C/A code. The signal produced by the code phase register is synchronous with chip times in the early version of the local code. At every sample clock time the code phase register also provides the phase angle value to the code phase decoder 40, which controls the complex accumulation registers 32.

Figure 5:
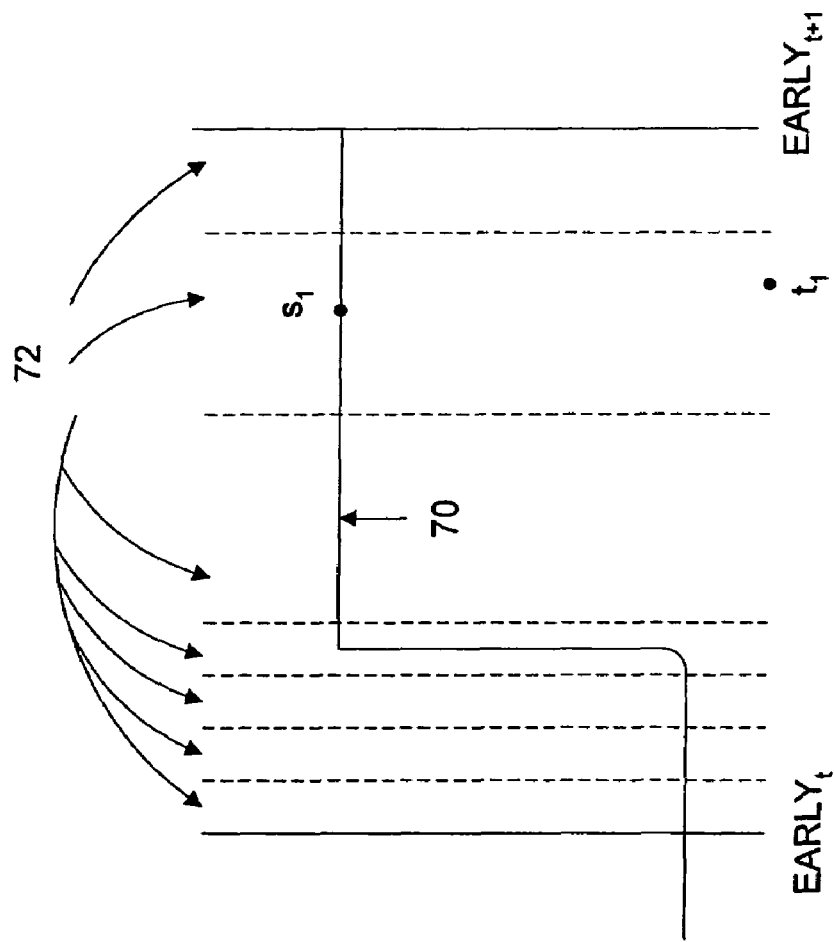
FIG. 5 is an illustration of code chip ranges.

Before discussing the operations of the code phase decoder 40 in more detail, we refer to FIG. 5 to describe the code chip ranges that are associated with the accumulation registers 32. As shown in the drawing, a code chip 70 is segmented into a plurality of code chip ranges 72, each of which is a fraction of a code chip. The sample $s_1$ taken at time $t_1$ has a phase angle that is included in a range that covers the middle of the chip. As illustrated, the ranges near the chip rising edge may be smaller than the ranges that are near the middle of the chip, to provide more measurement detail to the MMT processor 50.

Referring again to FIG. 4, at each pulse of the sample clock (not shown) the code phase register 44 provides to the code phase decoder 40 a phase value that corresponds to the estimated position, or phase angle, of the corresponding sample relative to the underlying code chip. Thus, at sample time $t_1$ (FIG. 5), the code phase register provides to the code phase decoder a phase angle value that corresponds to the sample's mid-chip position. An n-bit decoder 82 decodes the phase angle value into signals that drive a plurality of AND gates 80. The AND gates 80 produce signals that selectively disable all but the complex accumulation register 32 that corresponds to the mid-chip range that includes the estimated phase angle of the sample. The enabled complex accumulation register 32 then accumulates the early measurement value that corresponds to the sample.

Figure 6:
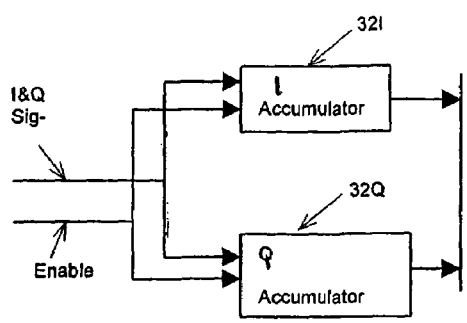
FIG. 6 is a block diagram of a complex accumulator.

As shown in FIG. 6, a complex accumulation register 32 includes I and Q registers 32I and 32Q. The signals produced by the code phase decoder thus selectively enable only one of the complex register pairs, such that the measurement is collected by the appropriate complex accumulation register 32.

The code generator 24 also produces an edge detect signal on line 41, which is used by the AND gates 80 of the code phase decoder 40 to assert an enable signal for the array 30 of complex accumulation registers 32. Following a chip polarity change in the locally generated code, the edge-detect signal is enabled and remains enabled for the entire chip. The edge-detect signal is not enabled at the start of a chip when there is no is change in the chip level, since the information that is most useful to the MMT processor 50 is produced during the chip-edge transitions. The corresponding measurement values may instead be accumulated in an accumulation register that is selectively enabled when the edge detect signal is not enabled. These measurements, which include very little phase modulation, are provided at appropriate times to the MMT processor 50.

Alternatively, as discussed in more detail below, the edge-detect signal could be set to enable the accumulation of samples in the accumulation registers 32 only when there is no chip transition in the in-phase code. The collected data would then be is useful in locating the chip edge of the quadrature code that is closest to the expected in-phase code chip transition. Examining the output of registers 32 when there is no in-phase chip transition provides clearer details of the quadrature code phase modulation of the in-phase code, which results in a "wiggle" occurring in the measurements, because interference from the relatively large transition of the in-phase code is eliminated from the measurements. The registers may instead alternate between the two modes of operations, depending on the presence or absence of a chip transition in the in-phase code.

The early measurements, that is, the results of multiplying the downconverted complex signal and the early version of the local code, are used for the complex-accumulation registers 32 in the embodiment described herein. However, any of the early, punctual or late measurements may instead be used, as long as the edge-detect signal is made synchronous with the selected measurements.

Figure 7:
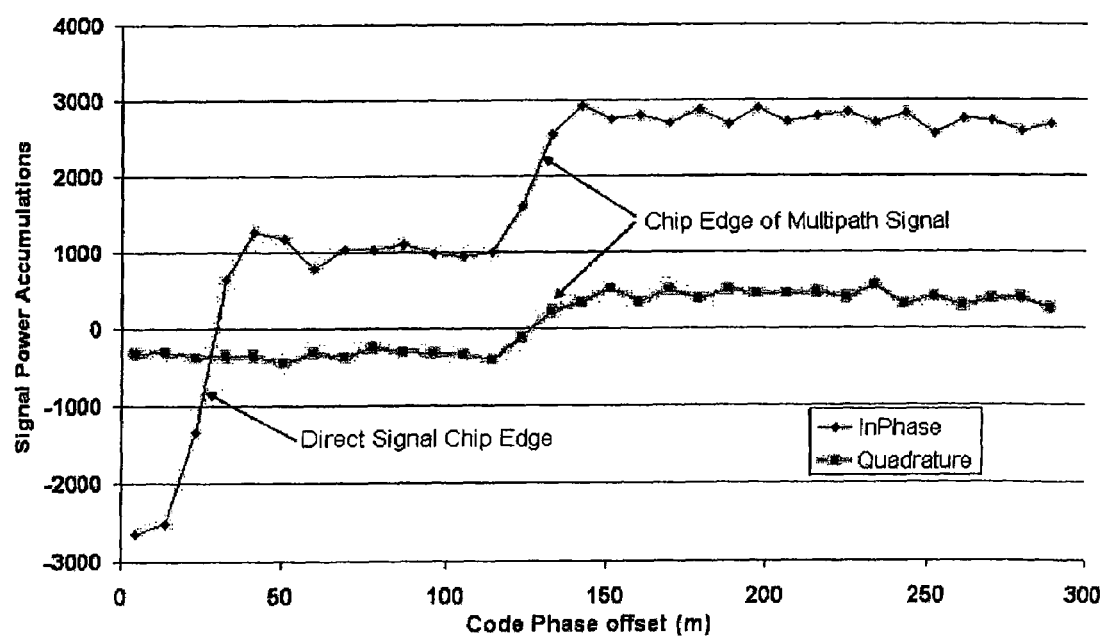
FIG. 7 is an example plot of the accumulated values taken by the complex accumulation registers of FIG. 2.

In operation, an in-phase PRN code in the satellite signal is acquired by the channel 16 in the usual manner. After the receiver is tracking in a steady-state phase locked loop, the contents of the complex-accumulation registers 32 are provided to the MMT processor 50. The MMT processor 50 processes the signals and determines if there is multipath interference. An exemplary set of a set of measurements of signals containing multipath interference is shown in FIG. 7. It can be seen in this example that the effect of the multipath signal can be easily distinguished from the chip edges of the direct signal. The measurements, which are based on 32 equally-sized ranges, provide the MMT processor with a very accurate representation of the received signal transmission chip shape. Using these measurements, the MMT processor operates in accordance with known MMTs to produce the code and carrier multipath error signals that remove the adverse affects of multipath interference from the code and carrier tracking operations. With the accurate representation of the direct path chip edges, the MMT processor 50 produces more accurate multipath code and carrier error signals in terms of code and carrier offsets. This leads directly to more accurate tracking of the direct signal code and carrier, and ultimately to more accurate pseudoranges.

After testing, it was determined that the in-phase PRN code chip may be advantageously divided into 4 to 8 ranges, although more may be used as in the example above. Four accumulation registers provide measurements from which the MMT processor 50 can accurately derive at least the chip edges in the direct path signal. Using the measurements from additional registers, the MMT processor may also accurately derive the chip edges of one or more multipath signals. If 4 accumulation registers are used, a first accumulation register is arranged to accumulate measurements from samples taken before the leading edge of the chip; a second accumulation register is arranged to accumulate measurements from samples taken from the start of the leading edge of a chip to a point mid-way along the edge; a third accumulation register is arranged to accumulate measurements taken from the mid-way point to the top of the leading edge of the chip; and a fourth accumulation register is arranged to take measurements from the top of the leading edge to the start of the range associated with the first accumulation register. As an example, the fourth accumulation register may collect measurements associated with samples taken along the chip to the falling edge. Three accumulation registers may ultimately be used, with the bounds for the range that covers the leading chip edge selected to provide sufficient information to the MMT processor 50.

The receiver collects pre-correlation measurements in the complex accumulation registers 32. The measurements are pre-correlation in the sense that the system does not drive the sample clock to take samples at pre-determined times relative to the estimated code chip boundaries. The system thus does not incorporate associated correlation errors into the measurements.

Once the MMT processor 50 estimates the locations of the chip edge in the direct path signal, the MMT processor 50 may adjust the ranges by, for example, shifting the starting points of and/or narrowing the ranges that include the estimated location of the chip edge and, as appropriate, widening the other ranges. Alternatively, or in addition, the MMT processor may reduce the number of ranges, such that the measurements associated with the mid-chip locations are included in fewer ranges, and so forth. To do this, the MMT processor controls the operations of the n-bit decoder, such that the decoder produces signals that enable the appropriate registers. When, for example, ranges associated with the chip edges are shifted or narrowed, the MMT processor 50 on line 51 communicates changes in the code phase offset values that are associated with the signals that the decoder produces to enable respective accumulation registers 32. The MMT processor 50 may vary the length, number and/or starting positions of the ranges by appropriately changing the code offset values associated with the respective accumulators.

The MMT processor may also compare the measured pulse shape with a reference chip transition shape, to determine if the received transmission includes other interference that may distort the calculated range. This is particularly important in safety-of-life applications, such as aircraft landings. The interference that can be detected in this manner is a type that affects the correlation operations of various receivers differently, and is otherwise hard to detect. Examples are satellite errors (including satellite component failures), microwave interference from nearby radio sources, receiver radio failures (including component failures), and so forth. Using the accurate pulse shape information provided by the complex accumulators 32, the MMT processor 50 is able to determine when such interference is present. The receiver may then ignore the received signals that include the interference or, as appropriate, correct for the distortion in the ranging calculations.

The complex accumulation registers 32 may be selectively grouped and their contents combined to provide signals that correspond to the accumulated early, punctual and late correlation values produced by the Early, Punctual and Late accumulators 28. Alternatively, or in addition, the complex accumulation registers 32 can be grouped to produce correlation values that correspond to the values produced by multiple early and multiple late correlators. The MMT processor 50 can thus operate as if using the multiple early and late correlators, without requiring any additional correlator hardware. Further, the receiver can change the groupings to narrow the effective correlator spacings.

The signals produced by the MMT processor 50 may instead be used directly to control the phase generator 22 and the CNCO 42. The MMT processor thus provides to these components as feedback signals the calculated direct path code time offset and phase angle, and the Early, Punctual and Late accumulators, PLL and DLL may be eliminated from the signal tracking operations. Thus, switches (not shown) may be added to the circuitry such that in one position the MMT processor corrects for multipath errors in the associated code and phase error signals produced by the phase error generator 82 and the code error generator 54. When the switches are in second positions, the signals produced by the MMT processor 50 are used directly to control the phase generator 22 and the CNCO 42.

Figure 8:
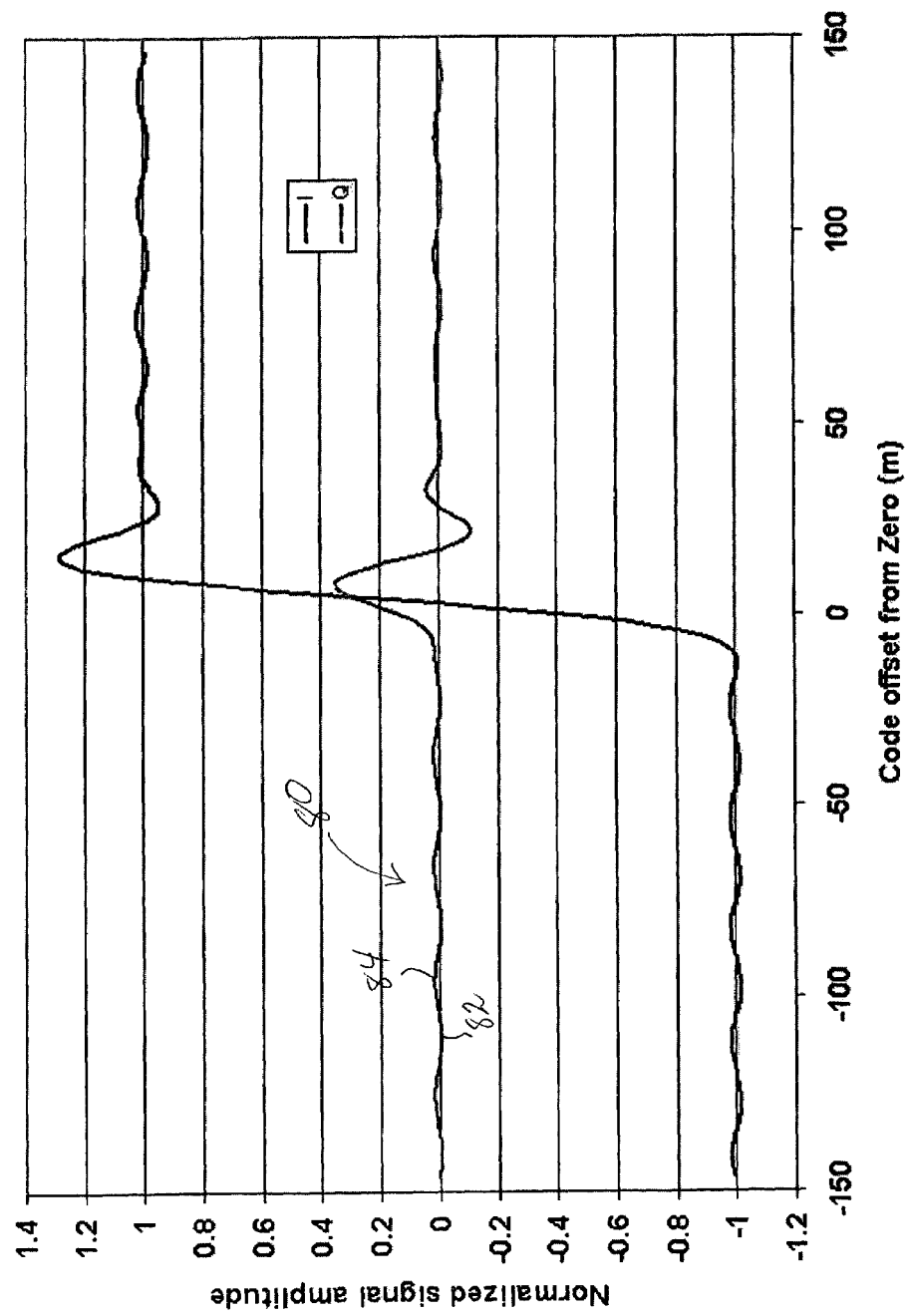
FIG. 8 views A, B and C are more detailed views of a portion of the example plot of FIG. 7, view A showing values obtained from plots from the I accumulators and Q accumulators and views B and C showing "wiggle" portions of the I and Q plots of view A in more detail.
Figure 8C:
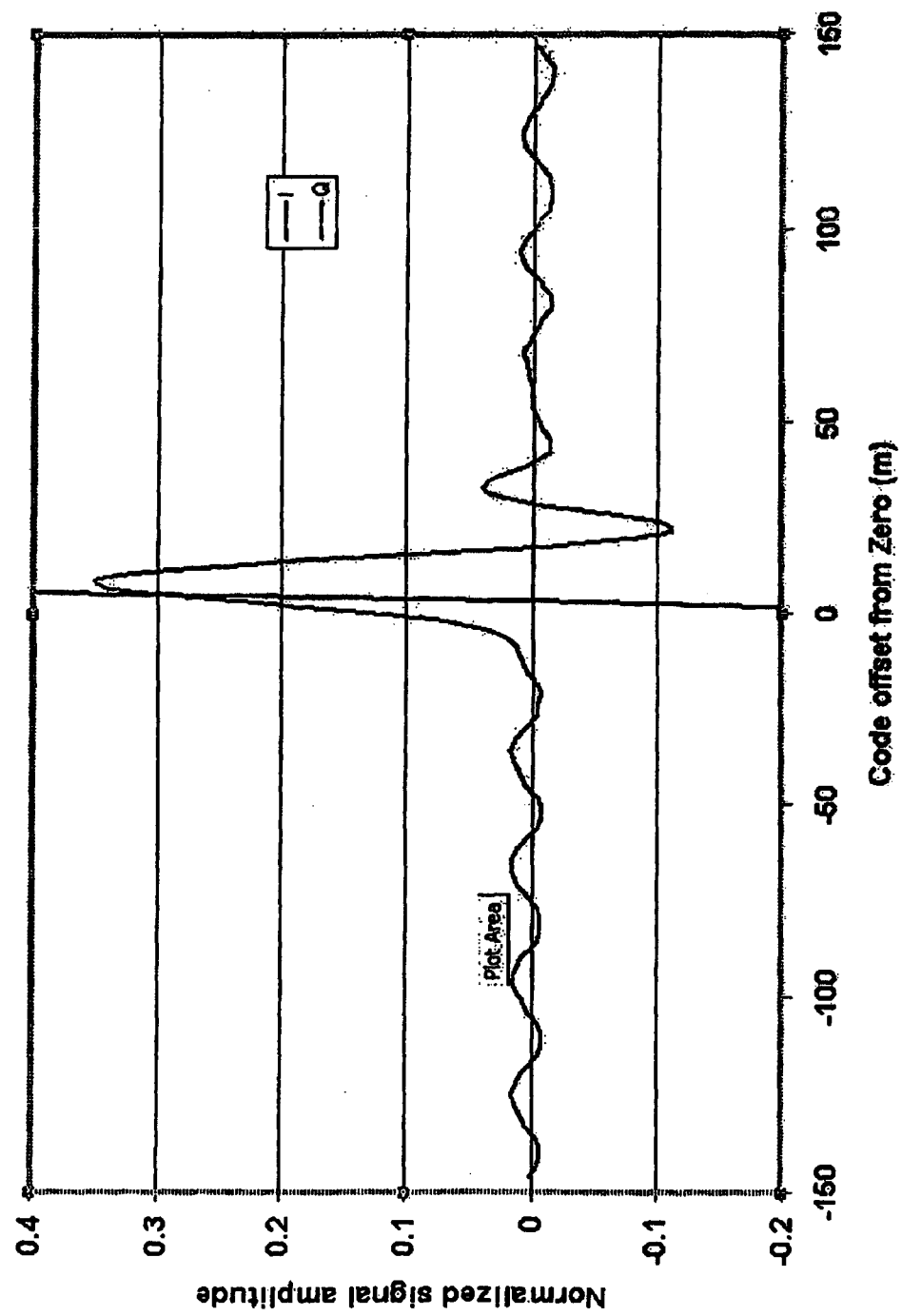

Referring now to FIG. 8, the demodulated signal strength measurements associated with the C/A code include a "wiggle" 80 that corresponds to chip transitions in the quadrature channel P-code. As discussed below, the receiver determines P-code phase information from the relative timing of the P-code chip transitions that occur closest in time to the C/A code chip transitions. The receiver can then remove from the C/A code pseudorange measurements biases that are attributable to slight differences in the transmission of what are supposed to be synchronous chip transitions in the C/A code and the P-code. The differences in the timing of the transitions at transmission are primarily due to the design of the satellite radios, and the differences thus tend to vary by satellite.

The receiver 10 uses the P-code phase information, that is, the timing of the P-code transition relative to the timing of the corresponding C/A code chip transition, in pseudorange calculations to remove from the C/A code pseudorange measurements the biases that occur with the C/A to P code offsets at transmission. The result is C/A code pseudorange measurements that have the same accuracy as pseudorange measurements generated from full P-code chip tracking or semi-codeless techniques. The pseudorange measurements produced by the receiver 10 can thus be compared to or used in calculations that involve pseudorange measurements made by P-code receivers, without requiring the receiver 10 to operate local P-code generators and/or associated P-code-tracking hardware.

Figure 9:
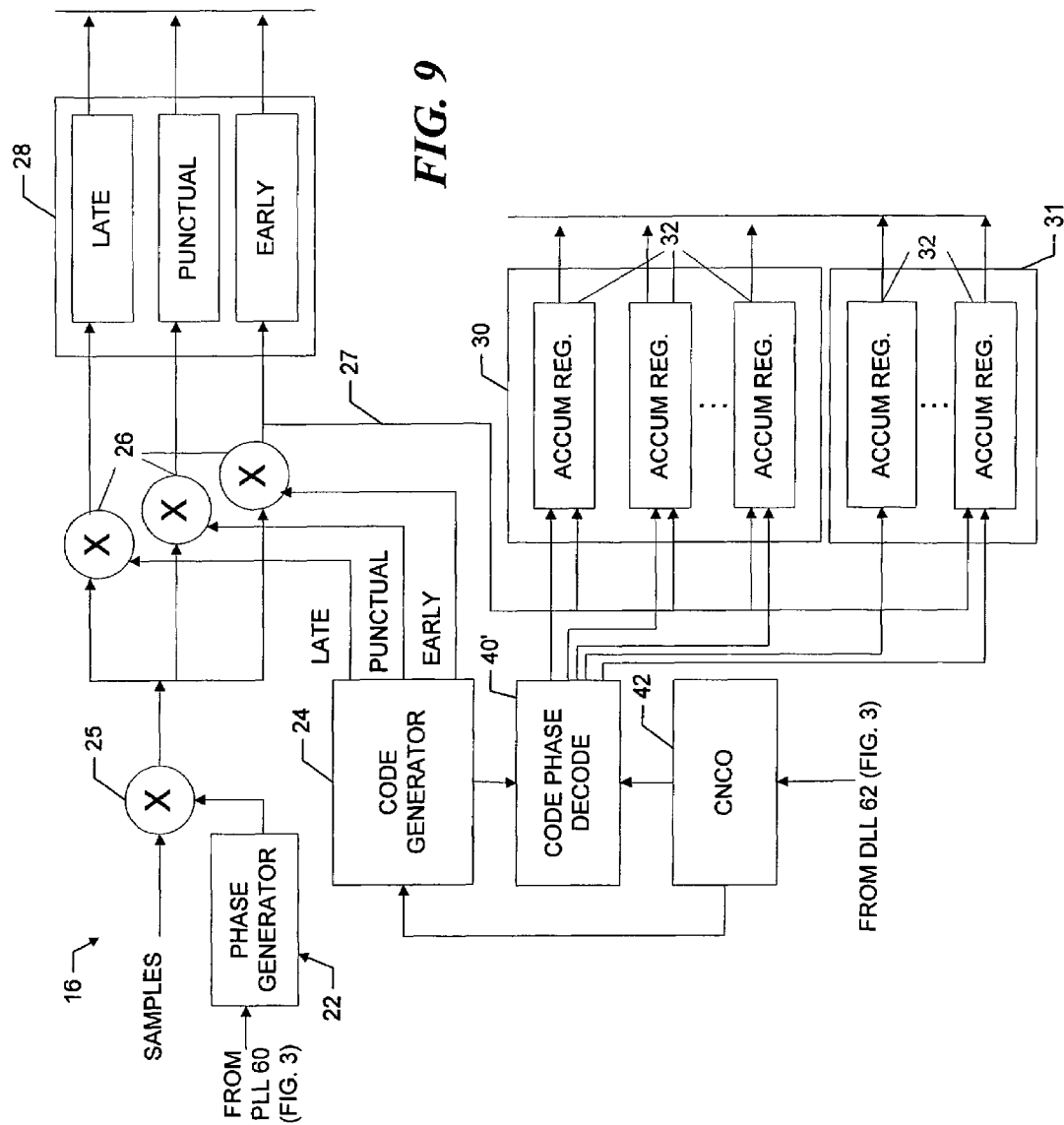
FIG. 9 is a block diagram of an alternative embodiment of the receiver channel of FIG. 2.

To detect the P-code chip transitions, the receiver 10 may use the receiver channel 16 and either the same array 30 of complex accumulators 32 used for C/A code pulse shape measurements or an additional array 31 of complex accumulators 32 (FIG. 9). Alternatively, the receiver may accumulate the P-code chip transition measurements in a second receiver channel 17 (FIG. 10), which is phase slaved to the local C/A code generated in receiver channel 16. Various alternatives of one and two channel embodiments are described below, though variations that achieve the same results are contemplated.

As shown in FIG. 9, a single channel 16 is used with an array 30 of complex accumulators 32 operating as described above to accumulate C/A code demodulated signal energy measurements during C/A code acquisition and tracking operations. Once the receiver is tracking the C/A code, the receiver operates in a P-code detection mode in which a code phase decoder 40' also operates to provide ranges that relate to the P-code chip transitions.

Under the control of the code phase decoder 40', the receiver combines measurements taken along corresponding ranges of the respective troughs 82 and crests 84 of the wiggle 80 (FIG. 8) in an array 31 of complex accumulators 32, to produce P-code chip transition pulse shape measurements. Alternatively, the decoder 40 may operate a selected subset of the accumulators 32 in the array 30 over ranges that accumulate the P-code chip transition measurements. The decoder then operates the remaining accumulators 32 in the array 30 to accumulate measurements from ranges selected to produce early and late C/A code measurement values, which are used to maintain C/A code tracking. Either way, the channel produces enable signals that relate to the detected P-code wiggle and the C/A code chip transitions, and provides the signals to the accumulation registers, to produce appropriate ranges for the accumulation of the demodulated C/A code signal strength measurements.

In this and other embodiments, the receiver 10 may accumulate the P-code chip transition measurements during the C/A code chip transition times, and manipulate the P-code measurement values to compensate for distortion in the measurements due to overlapping transitions in the C/A code. The distortion in the P-code wiggle 80 that occurs at the chip transition in the C/A code is shown in the plot of view A and the more detailed view C of FIG. 8. Alternatively, the receiver may make the P-code chip transition measurements at the times during which there are no transitions in the C/A code, and thus avoid the distortion as indicated in the view B of FIG. 8. The receiver may use a single set of accumulators and selectively accumulate the P-code and C/A code measurements as described above, or two sets of accumulators that operate over the respective ranges of interest.

Instead of switching to a P-code detection mode, the receiver 10 may include in the array 30 a relatively large number of complex accumulators 32, for example, 100 to 120, to accumulate measurements over the entire C/A code chip at all times. The receiver then uses the information in ranges that correspond to the wiggle 80, to estimate through interpolation the location of the P-code transition that is closest to the C/A code transition, since as noted above the closest P-code transition is not readily directly detected because of distortion. The P-code transitions that occur away from the C/A code transitions are not distorted by the C/A code transitions, and thus, the interpolation is relatively straight forward.

Figure 10:
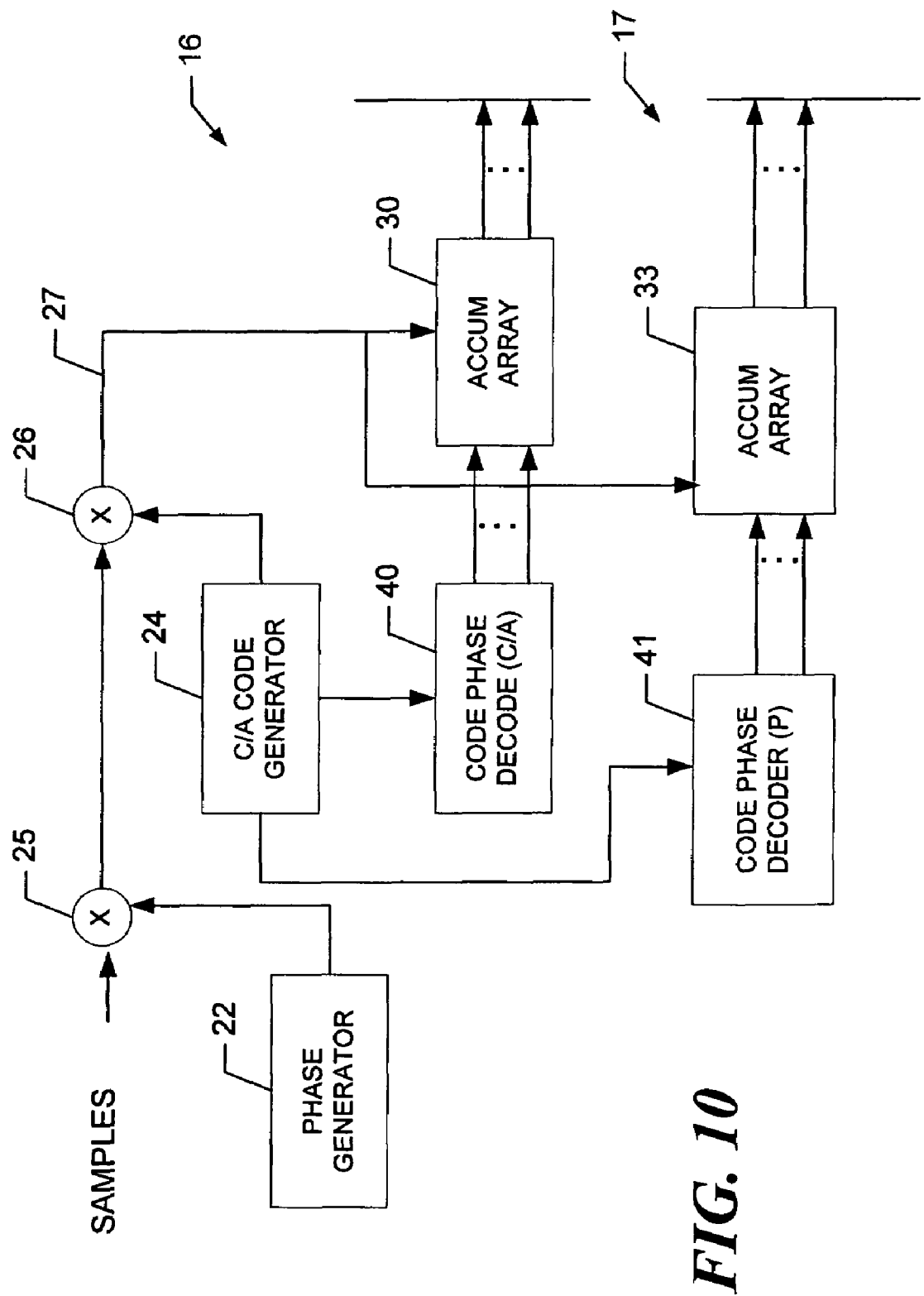
FIG. 10 is a block diagram of a two-channel embodiment.

Alternatively, as depicted in FIG. 10, the receiver may use two receiver channels 16 and 17 to accumulate the C/A code and P-code measurements. The first receiver channel 16 includes the code phase decoder 40, array 30 of complex accumulators 32, and C/A code generator 24 that operate as described above with reference to FIG. 2. For ease of understanding, other components of the channel, such as the CNCO 42, are not shown in this drawing. The second receiver channel 17 includes a P-code chip edge phase decoder 41 that is slaved to the C/A code generator 24 and an array 33 of complex accumulators 32 that operate under the control of the decoder 41. The second channel uses ranges that coincide with the sizes and locations of the respective crests 84 and troughs 82 of the wiggle 80 (FIG. 8). As described above, the decoder 41 may operate the array 33 to accumulate measurements at all times or only at times when there are no transitions in the C/A code.

To determine the relationship between the P-code chip edges and the phase of the measured "wiggle," a calibration is completed using a true P-code receiver. Alternatively, the relationship may be established by a mathematical analysis of the broadcast radio section of the satellite to determine the cause of the perturbation that produces the modulation. Further, based on an assumption that the P-code chip transitions have the same shape as the C/A code chip transitions produced by the satellite radio, the relationship may be determined by analyzing the pulse shape measurements to locate the P-code chip edges in the accumulated measurements. Once the offset or bias is determined, the receiver uses the establish relationship between the phase of the wiggle and the P-code to calculate the bias corrections for the corresponding C/A code pseudorange calculations. The receiver applies the corrections to the pseudorange calculations, and produces C/A pseudorange measurements that can be compared to, or used in, calculations that include P-code pseudorange measurements made by full P-code or semi-codeless P-code receivers.

The receiver described above may be used with L1 C/A code signals and the new generation L2 C code signals. Further, the receiver may be used with other GNSS signals in which the PRN codes on the in-phase and quadrature channels have known phase relationships.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention, including substituting the values produced by the MMT processor 50 for the Early, Punctual and Late accumulators, such that the DLL and PLL are eliminated, along with associated Punctual and Late versions of the local in-phase channel code. Further, the received signal may be sampled to produce simultaneous I and Q samples, and the mixer is then a complex mixer. The simultaneous samples are then processed in parallel, since each I and Q pair will always occur in the code chip range. The receiver may make the pulse shape measurements of the PRN code on the quadrature signal channel and from these measurements determine the zero crossings of the PRN code on the in-phase channel, if the in-phase channel PRN code has a higher chipping rate than the quadrature channel PRN code. Also, if separate channels are used to accumulate the measurements related to the two PRN codes, the second channel may include a PRN code generator that is slaved to the PRN code generator and/or the CNCO in the first channel to produce the demodulated signal strength values for use in the second channel.

What is claimed is:

1. A pre-correlation filter for a receiver that receives spread-spectrum signals, the filter including:
  an array of complex accumulation registers that collect measurements that correspond to samples of a first channel of the received signal multiplied by a local version of a first pseudorandom number (PRN) code transmitted over the first channel, the samples taken over multiple code chips of the first PRN code transmitted at sample times that are asynchronous to code rate, the respective accumulation registers being associated with code chip ranges each of which is a fraction of a PRN code chip and corresponds to code phase angles that are included in the range that covers the fraction of the PRN code chip, the code chip ranges together covering all or a portion of a code chip of the first PRN code and all or a portion of a code chip of a second PRN code transmitted on a second signal channel that is in quadrature phase to the first channel;

one or more code phase decoders that control the respective complex accumulation registers to direct respective measurements of the first signal channel of the received signal to the complex accumulation registers that are associated with the respective PRN code chip ranges from which the samples are taken, the one or more code phase decoders decoding values that correspond to the respective estimated code phase angles of the samples in the first PRN code to accumulate measurements that relate to chip transitions in the first PRN code and measurements that relate to chip transitions in the second PRN code.

2. The pre-correlation filter of claim 1, wherein the array of complex accumulation registers includes registers that accumulate measurements associated with the samples that correspond to code chips of the first PRN code, and registers that accumulate measurements associated with the samples that correspond to chip transitions of the second PRN code.

3. The pre-correlation filter of claim 2, wherein the registers that accumulate measurements associated with the samples that correspond to the code chips of the first PRN code acquire and track the first PRN code, and the registers that accumulate measurements associated with the samples that correspond to the chip transitions of the second PRN code accumulate measurements associated with the samples at ranges that fall within the respective code chips of the first PRN code.

4. The pre-correlation filter of claim 2, wherein the registers that accumulate measurements associated with the samples that correspond to code chips of the first PRN code are in a first receiver channel, and the registers that accumulate measurements associated with the samples that correspond to the chip transitions of the second PRN code are in a second receiver channel.

5. The pre-correlation filter claim 2, wherein the registers that accumulate measurements associated with the samples of the signal that correspond to the chip transitions of the second PRN code accumulate samples at times when there are no chip transitions in the first PRN code.

6. The pre-correlation filter of claim 1 wherein the first PRN code is an in-phase PRN code that is on an in-phase signal channel and the second PRN code is a quadrature PRN code that is on a quadrature signal channel, or the first PRN code is the quadrature PRN code that is on the quadrature signal channel and the second PRN code is the in-phase PRN code that is on the in-phase signal channel.

7. The pre-correlation filter of claim 1 wherein the code chip ranges covering rising code chip edges of one or both of the PRN codes are smaller than the code chip ranges covering other sections of the respective PRN code chips.

8. The pre-correlation filter of claim 1, wherein the code chip ranges are adjustable.

9. The pre-correlation filter of claim 1 wherein sizes, numbers and starting points of the code chip ranges associated with one or both PRN codes are selectively varied.

10. The pre-correlation filter of claim 2 wherein the code chip ranges that include an estimated location of the chip edges of the first PRN code in a direct path signal are narrowed for the first PRN code.

11. The pre-correlation filter of claim 2 wherein starting points of one or more code chip ranges are changed to selectively position the code chip ranges relative to the estimated location of the chip edges of the respective codes in a direct path signal.

12. The pre-correlation filter of claim 2 wherein a number of code chip ranges for one or both PRN codes is reduced after an estimate of the location of chip edges in a direct path signal is calculated.

13. The pre-correlation filter of claim 1, wherein the respective complex accumulation registers include I registers that collect measurements that correspond to in-phase samples and Q phase registers that collect measurements that correspond to quadrature samples.

14. A receiver for receiving spread-spectrum signals that include first and second pseudorandom number (PRN) codes on first and second signal channels, respectively, the receiver including:

a local code generator that produces a phase-delayed version of a first PRN code that is included in the first channel of the received signal;

a code phase generator that produces chip edge signals and code phase angles that correspond to an estimated code phase of the first PRN code;

a multiplier that multiplies the version of the first PRN code by samples taken of the first channel of the received signal and produces corresponding measurements;

a carrier phase generator that produces phase angles that correspond to an estimated carrier phase of the first signal channel of the received signal;

a pre-correlation filter that includes an array of complex accumulation registers that collect measurements that correspond to samples of the first channel of the received signal multiplied by the version of the first PRN code, the samples taken over multiple code chips of the first PRN code at sample times that are asynchronous to code rate, the respective accumulation registers being associated with code chip ranges each of which is a fraction of a PRN code chip and corresponds to code phase angles that are included in the range that covers the fraction of the PRN code chip, the code chip ranges together covering all or a portion of a code chip of the first PRN code;

one or more code phase decoders that control the complex accumulation registers to direct the measurements to the respective complex accumulation registers that are associated with the code chip ranges from which the associated samples are taken, the one or more code phase decoders decoding values that correspond to the estimated code phase angles of the samples in the first PRN code and providing ranges that relate to chip transitions in the first PRN code and to chip transitions in the second PRN code; and a processor for removing from pseudorange measurements calculated for the first PRN code biases that correspond to timing differences between the first and second PRN codes at the time of transmission.

15. The receiver of claim 14 further including:

a multipath mitigation processor that uses the measurements collected by the complex accumulation registers to produce code multipath error signals and carrier multipath error signals; and adders that combine the code multipath error signals and carrier multipath error signals with the code error signals and phase errors signals, respectively, to correct for code and carrier tracking errors associated with multipath interference, the adders producing the signals that are used to control the code generator and the phase generator.

16. The receiver of claim 15 wherein the local code generator produces multiple phase-delayed versions of the first PRN code, and the receiver further includes:

a plurality of multipliers that multiply the respective versions of the code by samples taken of the first channel of the received signal and produce corresponding measurements;

a code tracking delay lock loop that produces code error signals that are used to control the code rate of the code generator; and a carrier tracking phase lock loop that produces phase error signals that are used to control the phase generator.

17. A method of removing biases from a clear/acquisition (C/A) code pseudorange measurements, the method including the steps of:

taking measurements that correspond to samples of an in-phase signal channel multiplied by a version of the C/A code, the samples taken at sample times that are asynchronous to code rate;

accumulating the measurements that correspond to the samples over multiple code chips of the C/A code by separately combining the measurements that are associated with the respective code chip ranges from which the samples are taken, the ranges being based on respective estimated code phase angles of the samples in the C/A code and each code chip range being a fraction of a PRN code chip that corresponds to the code phase angles that are included in the range that covers the fraction of the PRN code chip, the code chip ranges together covering all or a portion of a C/A code chip;

determining P-code ranges that correspond to chip transitions in an associated P-code and accumulating the measurements that correspond to the P-code ranges;

determining locations of the P-code chip transitions that are closest to the chip transitions in the C/A code and using the associated phase information in C/A code pseudorange calculations to remove the biases associated with differences in timing between the C/A code and the P-code at transmission.

* * * * *